United States Patent [19]

Bryant

[11] Patent Number: 4,849,752

[45] Date of Patent: Jul. 18, 1989

[54] METHOD AND APPARATUS FOR CIRCUIT UNITS

[75] Inventor: Stewart F. Bryant, Redhill, England

[73] Assignee: U. S. Philips Corporation, New York, N.Y.

[21] Appl. No.: 145,682

[22] Filed: Jan. 14, 1988

Related U.S. Application Data

[63] Continuation of Ser. No. 911,592, Sep. 25, 1986, abandoned.

[30] Foreign Application Priority Data

Sep. 27, 1985 [GB] United Kingdom ............... 8523865

[51] Int. Cl.$^4$ .................. H04Q 1/00; H04L 11/00
[52] U.S. Cl. .................. 340/825.520; 340/825.070
[58] Field of Search .......... 340/825.5, 825.52, 825.53, 340/825.05, 825.07, 825.02; 178/2 C

[56] References Cited

U.S. PATENT DOCUMENTS

| | | | |
|---|---|---|---|
| 4,161,634 | 7/1979 | Belliso | 178/2 C |
| 4,423,414 | 12/1983 | Bryant et al. | 340/825.52 |
| 4,575,846 | 3/1986 | Yokomizo | 340/825.5 |
| 4,638,313 | 1/1987 | Sherwood et al. | 340/825.52 |
| 4,642,473 | 2/1987 | Bryant | 307/38 |
| 4,667,323 | 5/1987 | Engdahl | 340/825.52 |

FOREIGN PATENT DOCUMENTS

| | | | |
|---|---|---|---|
| 3244081 | 5/1984 | Fed. Rep. of Germany | 340/825.53 |
| 1295332 | 2/1970 | United Kingdom . | |

*Primary Examiner*—Donald J. Yusko
*Attorney, Agent, or Firm*—Bernard Franzblau; Gregory Gadson

[57] ABSTRACT

Method and apparatus for generating unique addresses for each of a plurality of circuit units (4-1 to 4-n) coupled to a single path (2) at individual spaced, coupling points along its length wherein a control circuit (1) transmits an address generation signal along the path (2). At each coupling point in turn the circuit unit modifies the address generation signal received so that a succeeding circuit unit receives modified, unmodified, or both modified and unmodified address generation signals dependent on the position of the circuit unit and on the form the modification takes. Various modifications are described including interrupting the passage of the address generation signal for a predetermined time and adding elements to the address generation signal.

35 Claims, 5 Drawing Sheets

Fig.5. a 
b 
c 
d 
e 

METHOD AND APPARATUS FOR CIRCUIT UNITS

This is a continuation of application Ser. No. 911,592 filed Sept. 25, 1986, now abandoned.

BACKGROUND OF THE INVENTION

This invention relates to a method of generating unique addresses for each of a plurality of circuit units coupled to a single path at individual spaced coupling points along its length, the method comprising the step of transmitting an address generation signal along said path.

The invention further relates to a circuit arrangement or network for generating a unique address for each of a plurality of circuit units, said circuit arrangement comprising a plurality of circuit units coupled to a single path at individual spaced coupling points along its length, and a control circuit for transmitting an address generation signal along the path from one end thereof, from which address generation signal each circuit unit derives a unique address, wherein each circuit unit includes an address generator.

The invention further relates to a circuit unit suitable for use in a circuit arrangement as set forth in the preceding paragraph, said circuit unit comprising an input for connection to said coupling point and an address generator coupled to said input, the state of the address generator being modified in response to address generation signals applied to said input.

U.K. Patent Specifications No. 1295332 discloses a method, an electrical circuit arrangement and an electrical circuit unit as set forth in the preceding paragraphs. The description with reference to FIGS. 6 and 7 of that specification shows a circuit arrangement comprising a plurality of terminals coupled to a transmission line at individual spaced coupling points approximately 10 meters apart. Each terminal includes an address generator which is incremented by a clock signal applied thereto via a gate which is opened and closed by a start and a stop signal transmitted along the transmission line. Each terminal is provided with a high frequency (10 MHz) clock signal generator. By using the signal propagation delay along the transmission line and ensuring a minimum spacing between terminals, a difference in the time of opening of the gate in each terminal can be achieved such that the difference is greater than the period of the clock signal. Hence each address generator will provide a different address. This circuit arrangement may be satisfactory where a large spacing between terminals is possible, though it may also impose stringent requirements on the clock signal generators, but is impracticable when the terminals are separated by small distances since the required clock frequency would be correspondingly increased.

SUMMARY OF THE INVENTION

It is an object of the invention to provide 2 simple means of assigning addresses to each of a plurality of circuit units in a circuit arrangement.

The invention provides a method of generating unique addresses for a plurality of circuit units as set forth in the opening paragraph characterized in that the method further comprises the steps of modifying the address generation signal at each coupling point in sequence, applying those modified and unmodified address generation signals available at each coupling point to the corresponding circuit unit, and deriving the address for each unit from the address generation signals applied thereto.

The method has the advantage that the signal propagation delay between the coupling points is not critical. The address is derived from the modified and unmodified signals at the coupling points and is not affected by tolerances of an internal clock controlled by the signals on the path.

The address generation signal modification step may comprise interrupting the transmission of the address generation signal along the path in such a manner that the interruption is sequentially effected at successive coupling points along the path. The method may comprise arranging each circuit unit to modify the address generation signal at regular intervals or at intervals dependent on the nature of the address generation signal, causing each circuit unit to detect whether a previous circuit unit nearer to the end of the path from which the address generation signal is transmitted has modified the address generation signal, and preventing each circuit unit which has detected that no previous unit has modified the address generation signal from subsequently modifying the address generation signal. The address generation signal may comprise a plurality of pulses or sets of pulses.

A method in which each circuit unit includes an address generator may be characterized in that the address generator of each unit is arranged to count the pulses or sets of pulses present at its coupling point either until or from a time dependent on the instant when the circuit unit has detected that no previous circuit unit has modified the address generation signal, the address allocated to each unit being dependent on the count contained in the address generator.

Using this method the address generators may be clocked by the pulses transmitted along the path rather than by the use of an internal clock as disclosed in U.K. Patent Specification No. 1,295,332. Since the presence of a signal on the path can be detected a fixed period after the start of each pulse, it is not critical which circuit unit is first to interrupt the path since all the circuit units will have done so by the time the sensing takes place. This assumes that the length of the pulses is significantly greater than the propagation time from one end of the path to the other. In practice this need not cause any difficulty since the length of the pulses used during address allocation can be made any desired value. It is desirable to make the interval between the pulses several times the propagation time of the pulses from one end to the other of the path if the path is formed as a transmission line to minimize the effect of reflected pulses from the discontinuities.

The method may be characterized in that the address generation signal comprises one or more level transitions or one or more pulses, that each circuit unit modifies the address generation signal by adding one or more level transitions or pulses to the address generation signal arriving at the coupling point to which that circuit unit is coupled, and that each circuit unit is provided with an address generator which counts the number of level transitions or pulses received at its coupling point and adopts an address dependent on the number counted.

This enables a simple address allocation to a number of circuit units only limited by the capacity of the address generators provided. Each unit may receive directly the address code which it is to adopt and is merely required to add one to that address and pass this signal on to the next unit.

The method may further comprise the steps of transmitting a reset signal along the path, detecting the arrival of the reset signal at each coupling point, and resetting the circuit units to a given state when the reset signal is detected.

This enables all of the circuit units to be set to an initial state either when power is initially applied or at any subsequent time, for example, when it is desired to re-allocate addresses.

The method may be characterized in that the one or more level transitions or pulses modulate a carrier signal, that each circuit unit demodulates the signal received at its coupling point, modifies the demodulated signal by adding one or more level transitions or pulses, re-modulates the modified signal and applies the remodulated signal to the paths, and that each circuit unit is provided with an address generator which counts the number of level transitions or pulses in the demodulated signal and adopts an address dependent on the number counted.

This enables, for example, a chain of radio stations to be allocated addresses. It can also, of course, be used when the path is a transmission line, either electrical or fiber optic.

The invention further provides a circuit arrangement as set forth in the second paragraph characterized in that each circuit unit further includes modifying means for modifying the address generation signal at its coupling point, monitoring means for determining whether a circuit unit having a coupling point nearer to said one end has modified the address generation signal and producing an output signal dependent thereon, inhibiting means for inhibiting the action of the modifying means in response to the output signal from the monitoring means, and controlling means for controlling the address generator in response to modified and unmodified address generation signals present at the coupling point.

This arrangement has the advantage that the propagation delay between the points at which successive circuit units are connected is not critical.

The address generation signal may comprise a plurality of pulses or sets of pulses or a carrier signal modulated by said pulses or sets of pulses, the modifying means being operative for intervals which start a given time after the commencement of each pulse or set of pulses and which end before the commencement of the next pulse or set of pulses.

The modifying means may comprise means for interrupting the passage of the address generation signal along the path.

The address generators are clocked by the pulses transmitted along the path rather than by the use of an internal clock. Since the presence of a signal on the path can be detected a fixed period after the start of each pulse it is not critical which circuit unit is first to interrupt the path as all the circuit units will have done so by the time the sensing takes place. It is desirable to make the interval between the pulses several times the propagation time of the pulses from one end to the other of the path when the path is formed as a transmission line to minimize the effect of reflected pulses from the discontinuities.

The address generation signal may comprise a plurality of pairs of pulses. With this arrangement the first pulse of the pair may be used for modifying the state of the address generators of the circuit units which do not yet posses their addresses while the path is interrupted during the period of the second pulse when sensing of the signal on the line also takes place. Thus it can be arranged that the interruption of the path starts between the first and second pulses to minimize the possibility of false detection of signals due to differences in the switching times of the circuit units.

The address generator in each circuit unit may comprise a binary counter which is incremented or decremented by the pulses or sets of pulses of the address generation signal until or from an instant depending on the output from the monitoring means.

This provides a simple technique to implement the address generator which may be arranged to provide an incrementally increasing address from one end of the path to the other. Clearly the counters could be set to a maximum count and the pulses applied used to count down or to a minimum count, and the pulses applied used to count up. Further, the count may start from the beginning of the address generation sequence and be terminated by the address generation signal modification or may start from the modification and be terminated by a common termination signal applied to all circuit units simultaneously. Further, the count could be started or terminated any desired number of pulses later.

The address generator of each circuit unit may be coupled to the path at a first point nearer to the control circuit than a second point at which interrupting means of that circuit unit is connected. A delay element may be coupled in the path between the first and second points.

The delay element may be required depending on the distance between the first and second points and the speed of operation of the monitoring and controlling means.

When the circuit arrangement is such that the control unit transmits pairs of pulses, the interrupting means may be effective to interrupt the path for a period which starts between the end of the first and the start of the second pulse and ends after the end of the second pulse of each pulse pair. This minimizes the possibility of spurious pulses propagating down the path because of differences in the switching times of the interrupting means in the different circuit units.

The controlling means may comprise a bistable circuit set to a desired state in response to a signal from the monitoring means, the output of the bistable circuit being coupled to the address generator to prevent the address generator from responding to further pulses received from the path.

This provides a simple means for capturing and retaining the desired address of the circuit unit.

When the signal path is a transmission line the interrupting means may comprise means for short circuiting the transmission line and the monitoring means may comprise means for detecting a current flowing in the short circuit.

Alternatively, the interrupting means may comprise means for open circuiting the transmission line. The means for open circuiting the transmission line may further comprise means for terminating the open circuited section of the transmission line with its characteristic impedance. This has the advantage of minimizing reflected pulses on the line.

The control circuit may be arranged to transmit a reset signal along said common path and each circuit unit may further comprise means for detecting said reset signal and resetting the address generator when a reset signal is detected.

This has the advantage that the control circuit can initiate an address allocation cycle on demand merely by sending a reset signal followed by an appropriate number of pulses or sets of pulses of the correct type. This facility may be used to enable further units to be attached to the transmission line and automatically be given an address which will depend on the position along the transmission line at which the unit is attached. If one alternative, that is a power on reset generation in each circuit unit, is employed then it is necessary to switch off the power to each circuit unit when a change is made to the arrangement. This may or may not be acceptable depending on the system in which it is used.

The address generation signal may comprise one or more signal level transitions or pulses or a carrier signal modulated by said one or more signal level transitions or pulses; each circuit unit then including modifying means for modifying the address generation signal received at its coupling point by adding one or more further level transitions or pulses to the received signal, means for applying the modified signal to the path for transmission along said path to a succeeding coupling point, and means for applying the received signal to the address generator so that the circuit unit adopts an address dependent on the number of level transitions or pulses received at its coupling point.

This enables the construction of an arrangement in which only a modified address generation signal is passed on from each coupling point and the circuit unit adopts an address dependent on the modified signal applied to its coupling point.

The address generator may comprise a binary counter which counts the number of level transitions or pulses received and whose state is adopted as the address of the circuit unit.

The address generation signal may comprise a carrier signal modulated by one or more level transitions or pulses or a plurality of pulses or sets of pulses, each circuit unit may include demodulator for demodulating the demodulated carrier signal present at its coupling point, means for modifying the demodulated signal, means for remodulating the modified signal, means for applying the remodulated signal to the path for transmission to succeeding circuit units and means for deriving its address from the demodulated signals.

Each circuit unit may include a radio receiver and a radio transmitter, each radio transmitter being arranged to transmit a signal only to one receiver in the single path comprising the transmitters and receivers and paths therebetween.

The invention further provides a circuit unit as set forth in the third paragraph characterized in that said circuit unit further comprises modifying means for modifying the address generation signal applied to said input and output means for applying the modified address generation signal to said coupling point.

The circuit unit may comprise an input for connection to said coupling point and an address generator coupled to said input, the state of the address generator being modified in response to address generation signals applied to said input and be characterized in that said circuit unit further comprises modifying means for modifying the address generation signal applied to said input, output means for applying the modified address generation signal to the coupling point, monitoring means for determining whether a modified address generation signal has been applied to said input and producing an output dependent thereon, inhibiting means for inhibiting the action of the modifying means in response to the output of the monitoring means, and controlling means for controlling the address generator in response to the modified and unmodified address generation signals present at said input.

The circuit unit may comprise an input for connection to said coupling point and an address generator coupled to said input, the state of the address generator being modified in response to address generation signals applied to said input and be characterized in that said circuit unit further comprises modifying means for modifying the address generation signal applied to said input, and output means for applying the modified address generation signal to the coupling point, wherein the modifying means comprises means for adding one or more level transitions or pulses to the address generation signal applied to said input, the address generator comprises a counter which counts the number of level transitions or pulses applied to said input, and the circuit unit further comprises adopting means to enable the circuit unit to adopt the state of the counter as its address.

The circuit unit may further comprise reset detection means for detecting a reset signal applied to said input and producing an output in response to the detection of said reset signal and means for applying the output of the reset detection means to the address generator to reset the address generator to an initial state.

A circuit unit for use when the address generation signal comprises a carrier signal modulated by one or more level transitions or pulses or a plurality of pulses or sets of pulses may be characterized in that the circuit unit further comprises a demodulator coupled to said input, the demodulated output being coupled to said address generator and said modifying means, a modulator for modulating a carrier signal by the modified demodulated signal and means for applying the output of the modulator to the output means.

DESCRIPTION OF THE DRAWINGS

Embodiments of the invention will now be described, by way of example, with reference to the accompanying drawings, in which:

FIGS. 3a-f show signal waveforms at various points in the circuit unit shown in FIG. 2, FIG. 4 shows a second embodiment of a circuit unit suitable for use in the circuit arrangement of FIG. 1, FIGS. 5a-e show signal waveforms at various points in the circuit unit shown in FIG. 4.

DETAILED DESCRIPTION

Figure 1:
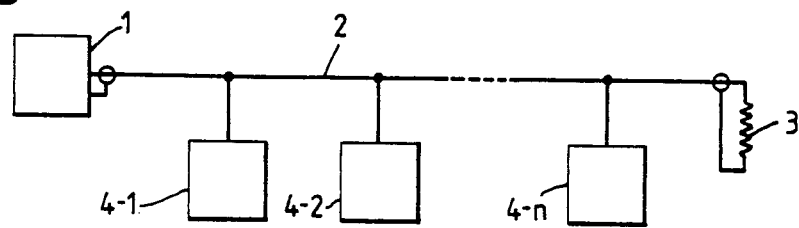
FIG. 1 shows in block schematic form a circuit arrangement according to the invention.

FIG. 1 shows in block schematic form a circuit arrangement network comprising a control circuit 1 having an output connected to a transmission line 2, for example, coaxial cable, which is terminated by an impedance 3 equal to the characteristic impedance of the transmission line. The transmission line could alternatively be an optical fiber with each circuit unit 4-1 to 4-n including appropriate opto-electric and electro-optic converters. Further the circuit units could comprise optical circuits, which optical circuits may comprise optical switching circuits in which case the opto-electric and electro-optic converters would not be present. A plurality of circuit units 4-1 to 4-n are connected at successive individual spaced coupling points along the transmission line 2. The control circuit 1 is arranged to transmit an address generation signal which may comprise a plurality of pulses or sets of pulses, the number of pulses or sets of pulses, being greater than or equal to n, where n is the number of circuit units connected to the transmission line. In one embodiment which will be further described hereinafter, the central circuit transmits pairs of pulses, as illustrated in waveform (a) of FIG. 3, along the transmission line 2, while in another embodiment, the control circuit is arranged to send a series of single pulses, as illustrated in waveform (a) of FIG. 5, along the transmission line 2. Each circuit unit 4-1 to 4-n may comprise an address generator the state of which may be changed in response to pulses applied to it, and an arrangement for interrupting the transmission line at a time related to the leading edge of each pulse or set of pulses if the circuit unit does not possess its address.

A procedure by which the circuit units obtain their addresses may be as follows. When the first pulse or set of pulses is transmitted along the transmission line 2 each address generator is incremented on the leading edge. A short time later (less than the pulse width or the interval of the set of pulses) each circuit unit 4-1 to 4-n interrupts the transmission line 2 for a time interval which ends before the start of the next pulse or set of pulses. This may be achieved by open or short circuiting the transmission line at the point where each circuit unit is attached thereto. If a train of single pulses is used, then each circuit unit detects whether a circuit unit nearer to the control circuit has interrupted the transmission line. This can be achieved in the case where each circuit unit applies a short circuit to the line by detecting a current flow in the short circuit. Such a current flow will, of course, only be detected in the short circuit applied by the circuit unit nearest to the control circuit. The circuit unit which detects a current flowing in the short circuit then adopts the present state of the address generator as its allocated address and no longer applies a short circuit to the transmission line. For the first pulse of the pulse train transmitted by the control circuit this will be the first circuit unit 4-1. On the second pulse each address generator except that in the first circuit unit 4-1 will again be incremented and after the short time interval all the circuit units except the first circuit unit 4-1 again apply a short circuit to the line. This time the second circuit unit 4-2 will detect a current in the short circuit it applied to the line and adopt the present state of its address generator as its allocated address, and will no longer apply a short circuit to the transmission line. This process is continued until all circuit units have obtained their address. It is necessary to ensure that sufficient pulses or sets of pulses are transmitted to ensure that all circuit units obtain their addresses; i.e., at least as many pulses must be transmitted as there are circuit units attached to the transmission line. In practice it is convenient to transmit a number of pulses which corresponds to the address generator capacity, for example if the arrangement operates with 8 bit addresses then 256 pulses or sets of pulses may be transmitted. In such an arrangement it would not be possible to provide unique addresses for more than 256 circuit units. An alternative arrangement for ensuring that sufficient pulses have been transmitted to allocate addresses to all of the circuit units connected to the transmission line would be to monitor the current in the termination of the transmission line to detect when the circuit units no longer interrupt the transmission line. This has the advantage that certain malfunctions of the circuit units can be detected. For example, if a circuit unit fails to stop short circuiting the transmission line due to an internal fault, the fact that the line is interrupted for more than the period of a given maximum number of pulses can be detected and used to raise an alarm.

It is clear that instead of applying a short circuit to the transmission line 2 each circuit unit 4-1 to 4-n could alternatively interrupt the line by open circuiting it. In this case the voltage on the line would be detected instead of the current in the short circuit.

If the path is an optical fiber it may be interrupted by means of optical switches or relays. The optical switches may operate, for example by physically separating fiber ends, or by means of electrically controllable cross-polarizers. An embodiment using pneumatic logic would interrupt the path by appropriately switching pneumatic valves.

Various other methods can be used to generate addresses for the circuit units. For example, instead of interrupting the transmission line, each circuit unit may be arranged to modify the address generation signal passed down the transmission line in some other fashion. If sets of pulses, such as pulse pairs, are transmitted by the control circuit 1, each circuit unit 4-1 to 4-n may be arranged to add a further pulse a fixed time after the second pulse is received, or to extend the duration of a single pulse if a single pulse is transmitted, until it detects that no preceding circuit unit has modified the signal in this way. Another alternative is for each circuit unit to add one pulse to the number of pulses it receives and to count the number of pulses received and use this to generate its address. In this case only a single pulse, or a single transition, has to be transmitted by the control circuit 1. When using this alternative the transmission line is looped through the circuit units at least during the address generation period.

Figure 2:
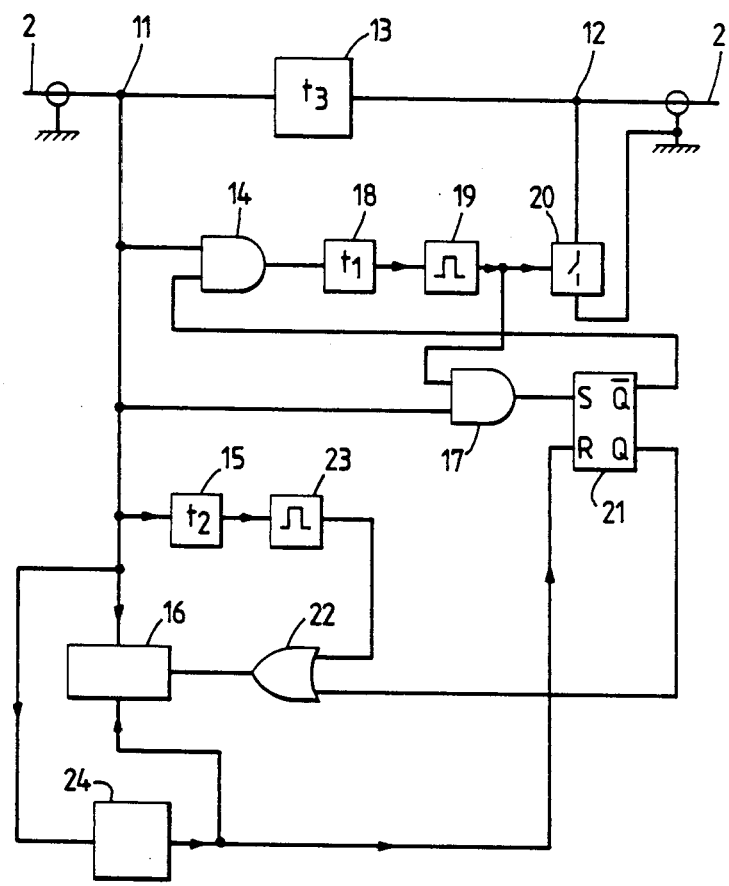
FIG. 2 shows an embodiment of a circuit unit suitable for use in the circuit arrangement of FIG. 1 when signals in the form of pulse pairs are transmitted.

FIG. 2 shows a first embodiment of part of a circuit unit suitable for use in the circuit arrangement of FIG. 1 when the control circuit is arranged to transmit a series of pairs of pulses as shown in FIG. 3a) along the transmission line 2. The circuit unit shown in FIG. 2 is connected to the transmission line 2 at two places 11 and 12 separated by a delay 13 which may be the transmission delay between the two points on the transmission line, for example, coaxial cable, or may further include a delay element to increase the transmission delay between points 11 and 12. The point 11 is connected to a first input of an AND gate 14, to the input of a delay element 15, to a clock input of an address generator 16 which may be in the form of a binary counter, and to a first input of an AND gate 17. The output of AND gate 14 is fed through a delay element 18 to the trigger input of a pulse generator 19, for example a monostable multivibrator. The output of the pulse generator 19 is connected to a control input of a switching arrangement 20, for example an FET, and to a second input of the AND gate 17. The switching arrangement 20 is connected between the point 12 and ground. The output of the AND gate 17 is fed to the set input of a bistable circuit 21. The Q output of the bistable 21 is connected to a first input of an OR gate 22 while the $\overline{Q}$ output of the bistable 21 is connected to a second input of the AND gate 14. The output of the delay element 15 is connected to the trigger input of a pulse generator 23, for example a monostable multivibrator, whose output is connected to a second input of the OR gate 22. The output of the OR gate 22 is connected to an inhibit input of the address generator 16. The point 11 is also connected to an input of a reset generator 24 whose output is connected to a reset input of the bistable 21 and to a reset input of the address generator 16.

In operation the control circuit 1 transmits a reset signal along the transmission line 2 which causes the reset generator 24 in each unit to produce a reset signal which sets the bistable 21 and address generator 16 to a desired initial state. Thus the $\overline{Q}$ output of the bistable is set to a logical '1' and the state of the address generator may be set to all zeroes. The reset signal may be of any form which is not mimicked by the address generator or information signals transmitted along the transmission line and could be, for example, a line polarity reversal of a given duration. One alternative is to transmit and detect selected frequency tones. Once the circuit units have been reset the procedure for generating the addresses is commenced. A series of pulse pairs as shown in FIG. 3a) is transmitted by the control circuit 1. On the leading edge of the first pulse of the pair the address generator 16 is incremented, and after a time $\tau_1$ which is equal to the delay introduced by the delay element 15, an inhibit signal is applied to the address generator 16 to prevent it from being incremented by the second pulse of the pair. The inhibit signal produced by the pulse generator 23 lasts until the second pulse of the pair has ceased as shown in FIG. 3b) which illustrates the waveform at the output of the pulse generator 23. After a time $\tau_2$ which is equal to the delay introduced by the delay element 18, the switch 20 is closed to short circuit the transmission line 2 at the point 12. The period $\tau_2$ is chosen so that the short circuit is applied to the transmission line at a time between the occurrence of the first and second pulses of the pair. The short circuit is applied to the transmission line for a period which lasts until the second pulse of the pair has ceased as shown in FIG. 3c) which illustrates the control signal generated by the pulse generator 19 and applied to the switch 20. If a circuit unit nearer to the control circuit than the present unit has applied a short circuit to the transmission line 2 then the first pulse of the pair only will be detected by the circuit unit and FIG. 3e) shows the signal which arrives at point 11 for the first pulse pair from which it can be seen that only the first pulse is present. Consequently the state of the output of the AND gate 17 will remain at a logical '0' as shown in FIG. 3d) and the bistable 21 will remain reset. The waveform at the point 12 is shown in FIG. 3f) from which it can be seen that the first pulse only is passed and that it is delayed by a period $\tau_3$ with respect to its time at point 11.

On the arrival of the first pulse of the next pulse pair the process is repeated; i.e., the address generator is incremented and a short circuit is applied to the transmission line starting at an instant between the end of the first and start of the second pulse of the pair. It is now assumed that no preceding circuit unit has applied a short circuit to the transmission line. The second pulse of the pair now arrives at the point 11 and after the delay $\tau_3$, arrives at the short circuit from which it is reflected. Consequently it arrives back at the point 11 in inverted form a time $2\tau_3$ later. The delay $\tau_3$ is arranged to be very much shorter than the length of the second pulse. Thus a short pulse of length $2\tau_3$ is applied to the bistable 21 causing its state to change. This pulse causes a permanent inhibit signal to be applied to the address generator 16 through the OR gate 22 and also applies a disable signal to the AND gate 14. FIG. 3d) shows under the second pulse pair the short pulse produced at the output of the AND gate 17 to set the bistable 21 while FIG. 3e) shows the signal at point 11. The positive and negative pulses will both be of length $2\tau_3$ while the duration of the intermediate zero level will depend on the length of the second pulse of the pulse pair. The circuit unit now possesses its address and when the next pulse pair arrives it will not increment its address generator nor short circuit the transmission line.

Since the bistable 21 has been set when the first pulse of the next pulse pair arrives there will be a logical '0' on the second input of the AND gate 14 and hence the pulse generator 19 will not be triggered. Consequently the switch 20 will remain open. The AND gate 17 will not produce an output since the pulse generator 19 will not produce an enabling pulse. The address generator 16 will not be incremented since the bistable 21 maintains an inhibit signal on its inhibit input. Consequently, as shown in FIG. 3f), both pulses will be passed down the transmission line to the further circuit units, if present, or to the termination. It should be noted that for the sake of simplicity reflections from short circuits applied by further circuit units on the third pulse pair have been ignored in FIGS. 3e) and 3f).

It will be clear to one skilled in the art that the switching arrangement 20 could be arranged to open circuit the transmission line 2 rather than short circuit it and that essentially the same result would be obtained. Further, the reset generator could be such that a reset was only generated when power is first applied to the circuit unit; i.e., the reset signal is generated internally on each circuit unit and no reset signal is applied over the transmission line. This requires, however, that when any change is to be made to the system, e.g., adding or re-arranging circuit units, all circuit units have to be switched off so that when power is restored a reset signal is generated in each unit and the address generation procedure can then be effected.

Figures 3, 4:
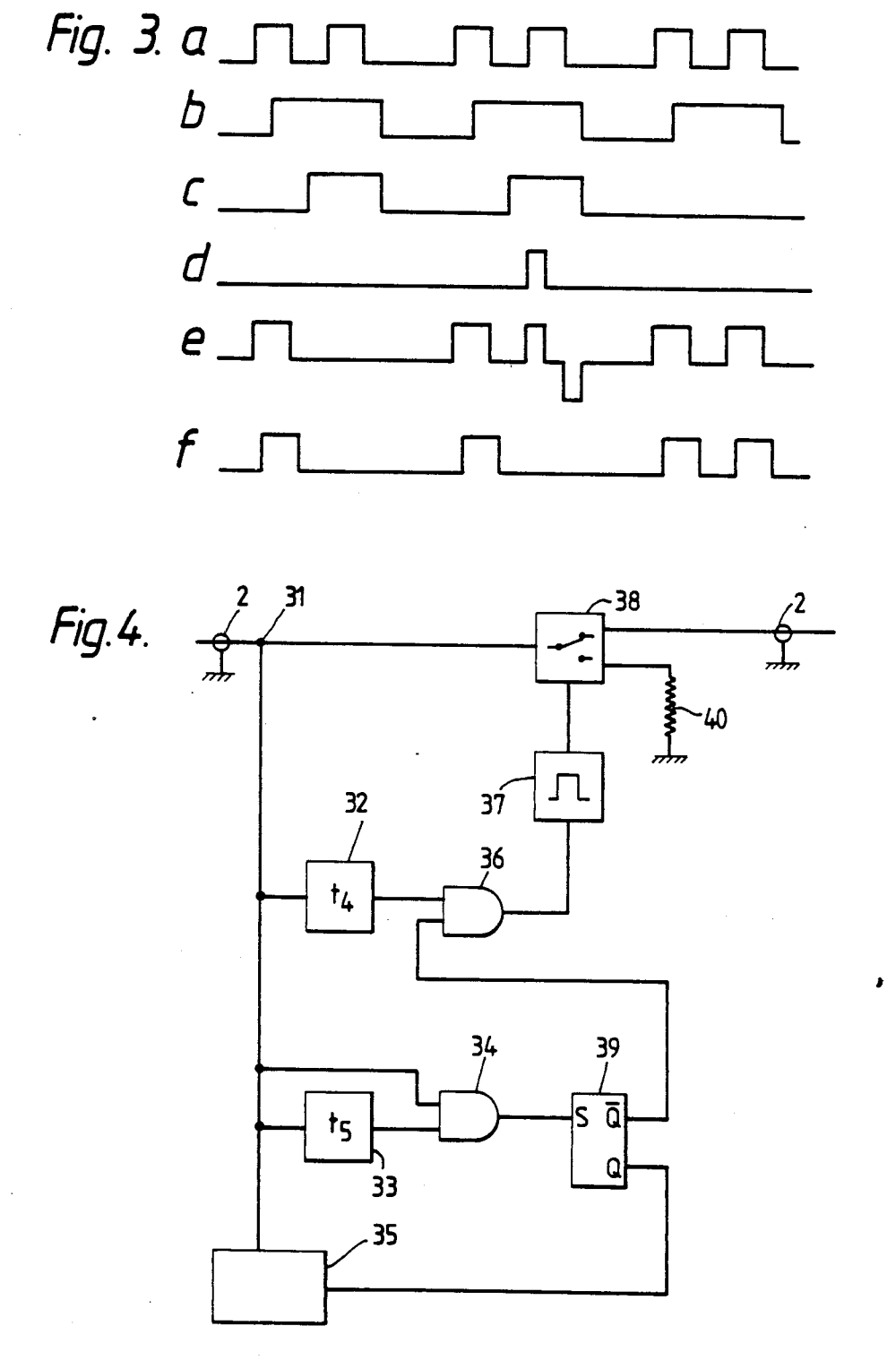

FIG. 4 shows an embodiment of a circuit unit suitable for use in a circuit arrangement as shown in FIG. 1 when the control circuit 1 is arranged to transmit a series of single pulses. The circuit unit is connected to the transmission line 2 at a point 31. The point 31 is connected to the input of a first delay element 32, the input of a second delay element 33, a first input of an AND gate 34, and to the clock input of an address generator 35. The output of the delay element 32 is connected to a first input of an AND gate 36 while the output of the delay element 33 is connected to a second input of the AND gate 34. The output of the AND gate 36 is connected to the trigger input of a pulse generator 37 whose output is connected to a control input of a switching arrangement 38. The output of the AND gate 34 is connected to the set input of a bistable circuit 39 whose Q output is connected to an inhibit input of the address generator 35 and whose $\overline{Q}$ output is connected to a second input of the AND gate 36.

The switching arrangement 38 comprises a changeover switch which in one position completes the transmission line 2, and in the other position open circuits the transmission line 2 and terminates the open circuited portion with an impedance 40 equal to the characteristic impedance of the transmission line.

In operation the control circuit 1 transmits a series of single pulses along the transmission line 2, three of these pulses being shown in FIG. 5a). In the description of the operation of this embodiment, it will be assumed that the circuit unit concerned obtains its address on the second pulse; i.e., a preceding circuit unit obtains its address on the first pulse and a following circuit unit obtains its address on the third pulse.

On the leading edge of the pulse, the address generator 35 is incremented, and after a delay $\tau_4$ determined by the delay element 32, the pulse generator 37 produces a pulse which operates the changeover switch 38 to cause the transmission line to be interrupted and terminated with the impedance 40. Thus the first pulse at point 31 is shortened since the previous circuit unit has interrupted the transmission line. This is illustrated in FIG. 5a) by the short solid line pulse, the dotted portion indicating the remainder of the orginally generated pulse. FIG. 5b) illustrates the signal at the output of the delay element 32 and hence for the first pulse the output of the AND gate 36 since the $\overline{Q}$ output of the bistable is at a logical '1'. FIG. 5c) illustrates the signal at the output of the delay element 33 which introduces a delay $\tau_5$ which is longer than the delay $\tau_4$. FIG. 5d) illustrates the signal at the output of the pulse generator 37 and hence the control signal for the changeover switch 38. FIG. 5e) illustrates the signal at the output of the AND gate 34 which provides a set signal for the bistable 39 when no previous circuit unit has opened the transmission line. However, for the first pulse shown in FIG. 5a) the AND gate 34 does not provide a set signal to the bistable 39 since the pulse at point 31 has been so far shortened that it does not overlap with the delayed pulse at the output of the delay element 33. Consequently, when the changeover switches in the units revert to their original state (at the end of each pulse shown in FIG. 5d) the occurrence of the second pulse will again cause the address generator to be incremented. Further, the changeover switch 38 will be operated to interrupt the transmission line 2, and terminate it with the impedance 40. However, as now no preceding unit has interrupted the transmission line, the pulse at point 31 will have the full generated pulse length. Consequently, and AND gate 34 will produce an output pulse (as shown in FIG. 5e)) which sets the bistable 39 so that its $\overline{Q}$ output goes to a logical '0' and disables the AND gate 36, and its Q output goes to a logical '1' to apply an inhibit signal to the address generator 35.

On the third pulse the circuit unit does not interrupt the transmission line since the AND gate 36 does not produce an output to trigger the pulse generator 37 and the address generator is not incremented because of the signal fed to its inhibit input from the Q output of the bistable 39.

It is of course necessary to be able to reset the bistable 39 and address generator 35 to a known original state, and this may be achieved in the same manner as described with reference to the FIG. 2 embodiment.

Figure 6:
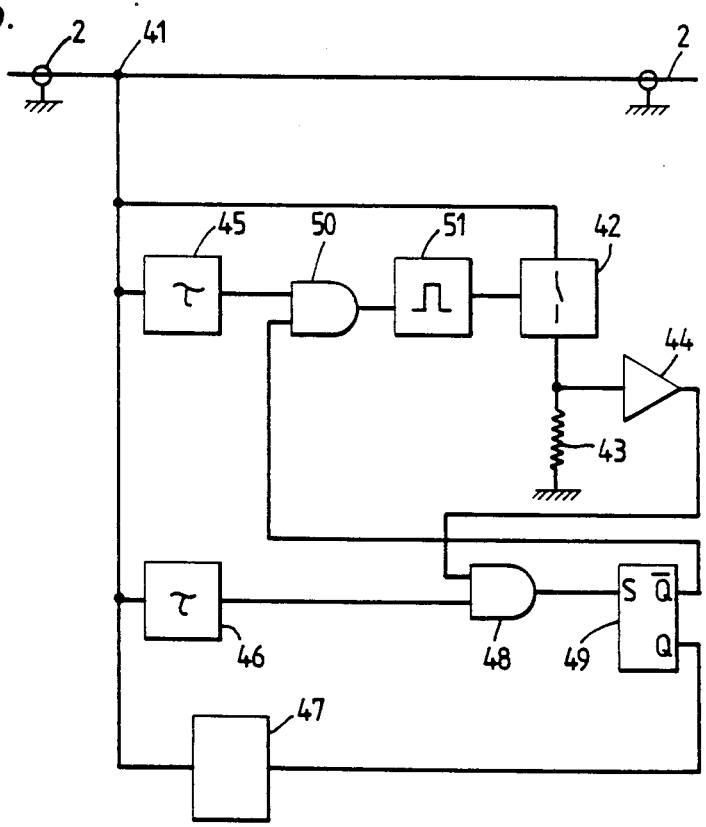
FIG. 6 shows a third embodiment of a circuit unit suitable for use in the circuit arrangement of FIG. 1.

FIG. 6 shows a further embodiment of a circuit unit suitable for use in the arrangement shown in FIG. 1. This embodiment has the advantage that only a single connection is required from the circuit unit to the transmission line to enable the address of the unit to be obtained. As shown in FIG. 6 the circuit unit is connected to the transmission line 2 at a point 41. The point 41 is connected to one terminal of a switching arrangement 42, another terminal of which is connected to ground via a low value current sensing resistor 43, and to the input of a threshold detector 44. The point 41 is also connected to the input of a first delay element 45, the input of a second delay element 46, and to the clock input of an address generator 47. The output of the threshold detector 44 is connected to a first input of an AND gate 48 while the output of the second delay element 46 is connected to a second input of the AND gate 48. The output of the AND gate 48 is fed to a set input of a bistable circuit 49 whose Q output is fed to an inhibit input of the address generator 47 and whose $\overline{Q}$ output is fed to a first input of an AND gate 50. The output of the first delay element 45 is fed to a second input of the AND gate 50. The output of the AND gate 50 is connected to the trigger input of a pulse generator 51 whose output provides a control signal for the switching arrangement 42.

In operation the control circuit 1 transmits a series of pulses along the transmission line 2, and when the leading edge of the pulse reaches the point 41 it increments the address generator 47. After a delay determined by the delay element 45 the pulse generator 51 is triggered by the output of the AND gate 50 (the $\overline{Q}$ output of the bistable 49 is initially at a logical '1') and causes the switch 42 to close. The resistor has a value very much smaller than the characteristic impedance of the transmission line so that the transmission line is effectively interrupted. The threshold detector produces an output if a current flow in the resistor 43 which will only happen if no preceding circuit unit has interrupted the line. If, however, a preceding circuit unit has interrupted the line, then the threshold detector will not detect a current and hence, the bistable 49 will remain reset. After the short circuit has been removed, at the end of the pulse produced by the pulse generator 51, the occurrence of the next pulse will again increment the address generator 47. If it is assumed that on this occasion no preceding unit has interrupted the transmission line, then when the switch 42 is operated the threshold detector 44 will detect a current in the resistor 43. Thus the threshold detector 44 produces an output for as long as the pulse is present and the switch 42 is made. This output enables AND gate 48 and when the delayed received pulse is applied to the other input of the AND gate 48 by the delay element 46, and AND gate 48 produces an output to set the bistable 49 and consequently its Q output goes to a logical '1' and inhibits further incrementation of the address generator and its $\overline{Q}$ output goes to a logical '0' disabling the AND gate 50. Consequently, when further pulses are received the address generator 47 will no longer be incremented and the pulse generator 51 will not produce a signal to close the switch 2. The delay element 46 delays the incoming pulse by a period greater than the delay element 45 so that the bistable 49 is not set if a preceding circuit unit interrupts the transmission line more slowly than the present unit or if there is a significant transmission time between a previous unit and the present unit.

The effect of a slower switching of a preceding unit or of transmission delay can also be mitigated by using pulse pairs as described with reference to FIG. 2. In this case the short circuit may be applied in the interval between the pulses of the pulse pair and, provided that a sufficient margin of time is available, a current will only be detected in the first short circuit along the line.

As an alternative to the sensing of the voltage across the resistor 43 by the threshold detector alternative, other methods of current detection, for example, current probes, may be used. This has the advantage of allowing a more effective short circuiting of the transmission line, thus minimizing any residual pulses being propagated past the nominal interruption point.

Again, resetting of the circuit units may be achieved in the same manner as described with reference to FIG. 2.

Figure 7:
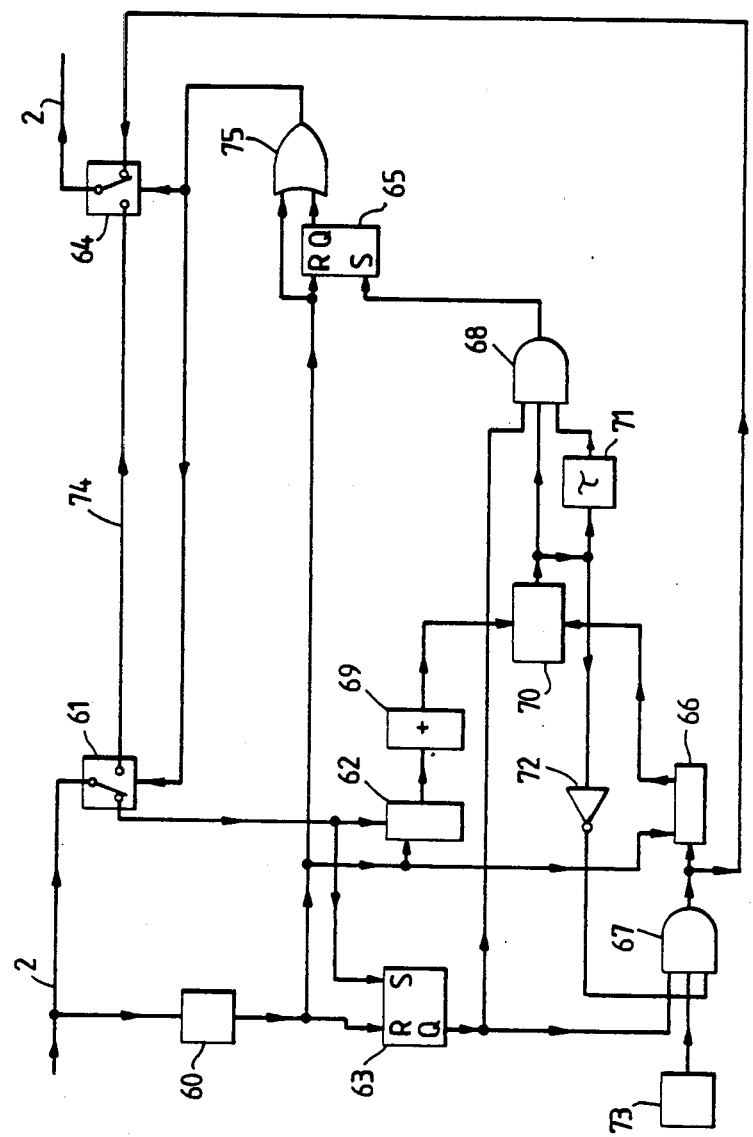
FIG. 7 shows a fourth embodiment of a circuit unit suitable for use in the circuit arrangement of FIG. 1.

FIG. 7 shows a fourth embodiment of a circuit unit suitable for use in an arrangement as shown in FIG. 1.

As shown in FIG. 7 the path 2 coupled into the circuit unit is connected to the input of a reset signal detection circuit 60 and to the pole of a changeover switch 61. The first contact of the switch 61 is connected to the clock input of a counter 62 and to the set input of a bistable circuit 63, while the second contact is connected to a second contact of a further changeover switch 64. The reset signal detection circuit has an output which is connected to reset inputs of the bistable circuit 63, a further bistable circuit 65, the counter 62 and a further counter 66. The Q output of the bistable circuit 63 is connected to a first input of an AND gate 67 and to a first input of a further AND gate 68. The output of the counter 62 is fed to an adding circuit 69 whose output is connected to a first input of a comparator 70 whose other input is connected to the output of the counter 66. The output of the comparator 70 is connected to a second input of the AND gate 68, to a third input of the AND gate 68 through a delay circuit 71, and to a third input of the AND gate 67 through an inverter 72. A clock generator 73 has an output connected to a second input of the AND gate 67. The output of the AND gate 67 is connected to the clock input of the counter 66 and to a first contact of the changeover switch 64, while the output of the AND gate 68 is connected to the set input of the bistable circuit 65. The Q output of the bistable circuit 65 is connected to a first input of an OR gate 75 whose output is connected to a control input of the changeover switches 61 and 64. The pole of changeover switch 64 is coupled to the path 2 for connection to circuit units downstream. The second contacts of the changeover switches 61 and 64 are coupled by a path 74. The output of the reset detector 60 is also connected to a second input of the OR gate 75.

In operation a reset signal is transmitted along the path 2. The reset signal detector 60 produces an output signal which resets the bistable circuits 63 and 65 and the counters 62 and 66. The reset signal also causes the switches 61 and 64 to change state so that the path 74 is switched into the path 2, i.e., the switches adopt the opposite state to that shown in FIG. 7. The reset signal is arranged to last for a sufficient period to allow all units to be reset; i.e., to allow the reset signal to propagate down the path 2 to all the units in turn. When the reset signal is terminated the changeover switches 61 and 64 adopt the state shown in FIG. 7. An address generation signal which may comprise one or more level transitions or pulses is then applied to the path 2 and passes through the switch 61 to the clock input of the counter 62. The counter 62 counts the incoming pulses and passes the count to the adding circuit 69 which adds one to the count. The adding circuit may be of any convenient form, for example a binary adder or a read only memory. The address generation signal also sets the bistable circuit 63 and consequently clock pulses generated by the clock generator 73 are coupled through AND gate 67 to the counter 66 and also to the path 2 via the changeover switch 64.

The outputs of the counter 66 and adding circuit 69 are compared in a comparator 70 and when equality is reached the comparator produces an output which is arranged to block the AND gate 67 through the inverter 72 and to enable the AND gate 68, provided that the output is maintained for a period greater than the delay introduced by the delay circuit 71. The presence of the delay circuit 71 prevents premature termination of the address generation signal which may otherwise occur if the pulse generator 73 produces pulses at a rate faster than those arriving over the path 2. This may cause the counter 66 to be incremented faster than the counter 62 and hence equality may be reached before the input pulses cease. However, the delay circuit 71 prevents the output of the AND gate 68 from immediately setting the bistable circuit 65 and thus when a further pulse arrives over the path 2 the output of the comparator 70 changes state and allows a further clock pulse to be applied to the counter 66 and path 2 via changeover switch 64. When the input address generation signal terminates, the AND gate 68 sets the bistable circuit 65 and the Q output of the bistable circuit is fed via the OR gate 75 to the control inputs of the switches 61 and 64, thus isolating the counter 62 from any further signals which may be transmitted over the path 2.

Thus each circuit unit transmits one more pulse to the succeeding circuit unit than it received from the preceding circuit unit and can adopt the state of the counter 62 as its address. Alternatively, the state of the counter 66 or the output of the adding circuit 69 could form the circuit unit address or, if desired, the state of any of these circuits could be used to address a read only memory whose output forms the circuit unit address. It is not, of course, necessary that only one pulse is be added by each circuit unit. More than one pulse could be added merely by causing the adding circuit to add two or more to the state of the counter 62.

The arrangement could, of course, be made to work in reverse. That is the control unit could be arranged to transmit a plurality of pulses, the number of pulses being greater than or equal to the number of circuit units and the circuit units could be arranged to delete a pulse at each stage. This could be accomplished by replacing the adding circuit 69 by a subtracting circuit. Various other arrangements for adding or deleting pulses would be readily apparent to those skilled in the art and could be substituted for the circuit unit shown in FIG. 7.

Figure 8:
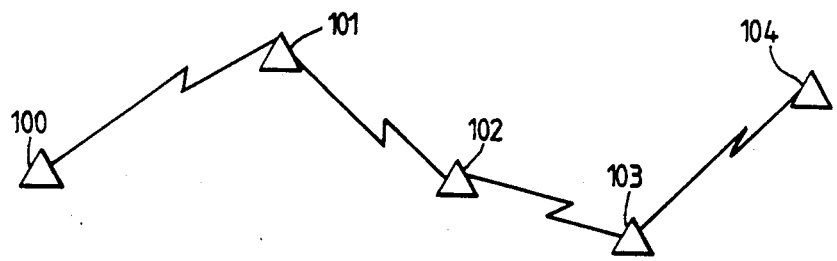
FIG. 8 shows in block schematic form a second embodiment of a circuit arrangement according to the invention.

The circuit arrangement shown in FIG. 8 shows a plurality of radio transmitter/receivers 100 to 104. The transmitter 100 acts as the control circuit and the transmitter/receiver 101 to 104 form the circuit units. The single path comprises the transmitter/receivers and the paths between them. It is of course necessary to ensure that each receiver only receives signals from one transmitter, at least during the address generation phase.

This can be achieved by line of sight transmission and ensuring that no receiver can see two transmitters.

Figure 9:
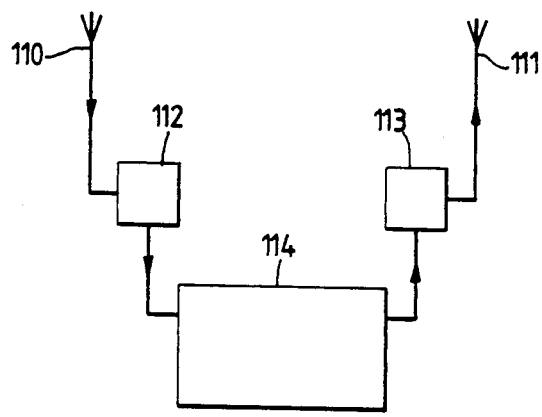
FIG. 9 shows a circuit unit suitable for use in the circuit arrangement of FIG. 8.

FIG. 9 shows the transmitter/receivers of FIG. 8 in block schematic form. Each transmitter/receiver comprises a receiving aerial 110 and a transmitting aerial 111. The receiving aerial 110 is connected to the input of a demodulator 112 while the transmitting aerial 111 is connected to the output of a modulator 113. A terminal circuit 114 is connected between the output of the demodulator 112 and the input of the modulator 113. The terminal circuit 114 contains the means for modifying the received address generation signal after demodulation in the demodulator 112. The modification may be made in a manner analogous to that described with respect to FIGS. 1 to 7 of this application. The modified signal is then applied to the modulator 113 for modulation and transmission to the next receiver in the chain. The terminal unit 114 may include a plurality of circuit units as described with respect to FIGS. 1 to 7 and a transmission path between them so that not only the transmitter/receiver but also functional parts within them may be automatically allocated addresses.

Various modifications and additions may be made to the circuit units described with reference to FIGS. 2 to 7 and 9. It should be noted that only the section of the circuit units concerned with the generation of the address has been shown. Address recognition means which may comprise a comparator having one input or set of inputs connected to the address generator and a second input or set of inputs which receive the transmitted address as illustrated in U.K. Patent application No. 8407620 which corresponds to U.S. Pat. No. 4,642,473 (2/10/87) the contents of which are hereby incorporated by reference, are needed to recognize when the circuit unit is being addressed during normal system operation. As described in that U.S. patent the connection between the transmission line and the address generation means may be via a changeover switch to enable the terminal to be used for other functions within the unit once the address generation cycle has been completed. Again, means may be provided for modifying the addresses of the circuit units under the control of the control circuit so that addresses no longer depend on the physical position of the circuit unit along the transmission line. The circuit units may take any form and range from individual integrated circuits through hybrid circuits and printed circuit boards to computer or telecommunications terminals. The arrangement may be used in local area networks, in various data bus systems, or in point to point radio communication systems. The circuit units may also take other than electrical forms, for example optical or pneumatic.

I claim:

1. A method of generating and allocating a unique address to each of a plurality of circuit units coupled to a single path at individual spaced, coupling points along its length comprising the steps of transmitting an address generation signal along said path, modifying the address generation signal at each coupling point in sequence, applying, if present, modified and unmodified address generation signals available at each coupling point to the corresponding circuit unit, and deriving the unique address for each circuit unit from the address generation signals applied thereto, and storing the derived unique address within the circuit unit.

2. The method in claim 1 wherein the address generation signal modification step comprises interrupting the transmission of the address generation signal along the path in such a manner that the interruption is sequentially effected at successive coupling points along the path.

3. The method in claim 1 further comprising the steps of arranging each circuit unit to modify the address generation signal at regular intervals or at intervals dependent on the nature of the address generation signal, detecting, at each circuit unit whether a previous circuit unit nearer to the end of the path from which address generation signal is transmitted has modified the address generation signal, and preventing each circuit unit which has detected that no previous unit has modified the address generation signal from subsequently modifying the address generation signal.

4. The method in claim 1 wherein the address generation signal comprises a plurality of pulses or sets of pulses.

5. The method of claim 3 in which the address generation signal comprises a carrier signal modulated by a signal which includes a plurality of pulses or sets of pulses.

6. The method in claim 4 in which each circuit unit includes an address generator characterised in that the address generator of each unit is arranged to count the pulses or sets of pulses present at its coupling point either until or from a time dependent on the instant when the circuit unit has detected that no previous circuit unit has modified the address generation signal, the address allocated to each circuit unit being dependent on the count contained in its address generator.

7. The method in claim 1 wherein: the address generation signal comprises one or more level transitions or one or more pulses, each circuit unit modifies the address generation signal by adding one or more level transitions or pulses to the address generation signal arriving at the coupling point to which that circuit unit is coupled, and each circuit unit includes an address generator which counts the number of level transitions or pulses received at its coupling point and adopts an address dependent on the number counted.

8. The method in claim 7 wherein the level transitions or pulses modulate a carrier signal, and each circuit unit demodulates the signal received at its coupling point, modifies the demodulated signal by adding one or more level transitions or pulses, re-modulates the modified signal and applies the remodulated signal to the path, and each circuit unit address generator counts the number of level transitions or pulses in the demodulated signal and adopts an address dependent on the number counted.

9. The method in any preceding claim further comprising the steps of transmitting a reset signal along the path, detecting the arrival of the reset signal at each coupling point, and resetting the circuit units to a given state when the reset signal is detected.

10. A network for generating and allocating a unique address for each of a plurality of circuit units comprising: a plurality of circuit units coupled to a single path at individual spaced, coupling points along its length, and a control circuit for transmitting an address generation signal along the path from one end thereof, from which address generation signal each circuit unit derives for itself a unique address, and wherein each circuit unit comprises; and address generator, means for modifying the address generation signal at its coupling point, monitoring means for determining whether a circuit unit having a coupling point nearer to said one end has modified the address generation signal and producing an output signal dependent thereon, means for inhibiting the action of the modifying means in response to the output signal from the monitoring means, and means for controlling the address generator in response to modified and unmodified address generation signals present at its coupling point.

11. The network in claim 10, wherein the address generation signal comprises a plurality of pulses or sets of pulses or a carrier signal modulated by said pulses or sets of pulses, and the modifying means is operative for time intervals which start a given time after commencement of each pulse or set of pulses and which end before commencement of the next pulse or set of pulses.

12. The network in claim 11, wherein the address generation signal comprises a plurality of pulse pairs.

13. The network in claim 10 wherein the modifying means comprises means for interrupting passage of the address generation signal along the path.

14. The network in claim 11, wherein the address generator in each circuit unit comprises a binary counter which is incremented or decremented by the pulses or sets of pulses of the address generation signal until or from an instant dependent on the output signal from the monitoring means.

15. The network in claim 13 wherein the address generator of each circuit unit is coupled to the path at a first point nearer to the control circuit than a second on the path at which the modifying means of that circuit unit is connected.

16. The circuit unit in claim 15, wherein a delay element is coupled in the path between the first and second points.

17. The network in claim 10 wherein the address generation signal comprises a plurality of pulse pairs and the modifying means comprise means for interrupting passage of the address generation signal along the path, said interrupting means being effective to interrupt the path for a period which starts between the end of the first and the start of the second pulse and ends after the end of the second pulse of each pulse pair.

18. The network in claim 11 wherein the controlling means comprises a bistable circuit set to a desired state in response to a signal from the monitoring means, and means coupling an output of the bistable circuit to the address generator to prevent the address generator from responding to further pulses received from the path.

19. The network in claim 13 wherein the path is a transmission line.

20. The network in claim 19, characterised in that the transmission line is an electrical transmission line terminated by its characteristic impedance.

21. The network in claim 20 wherein said interrupting means comprises means for short circuiting the transmission line.

22. The network in claim 21, wherein said monitoring means comprises means for detecting a current flowing in the short circuit.

23. The network in claim 20 wherein said interrupting means comprises means for open circuiting said transmission line.

24. The network in claim 23, wherein said means for open circuiting said transmission line further comprises means for terminating the open circuited section of the transmission line with its characteristic impedance.

25. The network in any of claims 10 to 24, wherein the control circuit includes a device to transmit a reset signal along said common path and each circuit unit further comprises means for detecting said reset signal and producing an output signal for resetting the address generator.

26. A network for generating and allocating a unique address for each of a plurality of circuit units, comprising: a plurality of circuit units coupled to a single path at individual spaced, coupling points along its length, and a control circuit for transmitting an address generation signal along the path from one end thereof, wherein each circuit unit comprise; an address generator, the address generation signal including one or more signal level transitions or pulses or a carrier signal modulated by said one or more signal level transitions or pulses, means for modifying the address generation signal received at its coupling point by adding one or more further level transitions or pulses to the received signal, means for applying the modified signal to the path for transmission along said path to a succeeding coupling point, and means for applying the received signal to the address generator so that the circuit unit generates an address for itself dependent on the number of level transitions or pulses received at its coupling point.

27. The network in claim 26, wherein the address generator comprises a binary counter which counts the number of level transitions or pulses received and whose state is adopted as the address of the circuit unit.

28. The network as claimed in claim 26 wherein the control circuit includes means for transmitting a reset signal and each circuit unit includes detecting means for detecting the reset signal and producing an output signal which is effective to reset the address generator to an initial state.

29. The network in claim 26, wherein the address generation signal comprises a carrier signal modulated by one or more level transitions or pulses or a plurality of pulses or sets of pulses, and each circuit unit includes a demodulator for demodulating the modulated carrier signal present at its coupling point, means for modifying the demodulated signal, means for remodulating the modified signal, means for applying the remodulated signal to the path for transmission to succeeding circuit units, and means for deriving its address from the demodulated signals.

30. The network in claim 29, wherein each circuit unit includes a radio receiver and a radio transmitter, each radio transmitter being arranged to transmit a signal only to one receiver and that the single path comprises the transmitters and receivers and paths therebetween.

31. A circuit unit suitable for use in the network in any of claims 10 to 20 or 28 to 30 comprising an input for connection to said coupling point and an address generator coupled to said input, the state of the address generator being modified in response to address generation signals applied to said input means for modifying the address generation signal applied to said input and output means for applying the modified address generation signal to said coupling point.

32. A circuit unit suitable for use in the network in any of claims 10 to 24 comprising: an input for connection to said coupling unit, means coupling the address generator to said input, the state of the address generator being modified in response to address generation signals applied to said input, means for modifying the address generation signal applied to said input, output means for applying the modified address generation signal to the coupling point, monitoring means for determining whether a modified address generation signal has been applied to said input and producing an output dependent thereon, means for inhibiting the action of the modifying means in response to the output of the monitoring means, and means for controlling the address generator in response to the modified and unmodified address generation signals present at said input.

33. A circuit unit suitable for use in the network in any of claims 26 to 30, said circuit unit comprising: an input for connection to said coupling point, means coupling the address generator to said input, the state of the address generator being modified in response to address generation signals applied to said input, means for modifying the address generation signal applied to said input, and output means for applying the modified address generation signal to the coupling point, wherein the modifying means comprises means for adding one or more level transitions or pulses to the address generation signal applied to said input, wherein the address generator comprises a counter which counts the number of level transitions or pulses applied to said input, and adopting means to enable the circuit unit to adopt the state of the counter as its address.

34. The circuit unit as claimed in claim 33, comprising reset detection means for detecting a reset signal applied to said input and producing an output in response to the detection of said reset signal, an means for applying the output of the reset detection means to the address generator to reset the address generator to an initial state.

35. A circuit unit as claimed in claim 33 for use when the address generation signal comprises a carrier signal modulated by one or more level transitions or pulses or a plurality of pulses, or sets of pulses wherein the circuit unit further comprises a demodulator coupled to said input, a demodulated output being coupled to said address generator and said modifying means, a modulator for modulating a carrier signal by the modified demodulated signal and means for applying the output of the modulator to the output means.

* * * * *